(12) United States Patent
Kuemmel (10) Patent No.: US 10,379,221 B2
(45) Date of Patent: Aug. 13, 2019

(54) APPARATUS FOR DETERMINING DISTANCE INFORMATION, TIME OF FLIGHT LIGHT SOURCE AND A DOCKING STATION

(71) Applicant: Infineon Technologies AG, Neubiberg (DE)

(72) Inventor: Hansjoerg Kuemmel, Munich (DE)

(73) Assignee: Infineon Technologies AG, Neubiberg (DE)

( * ) Notice: Subject to any disclaimer, the term of this patent is extended or adjusted under 35 U.S.C. 154(b) by 512 days.

(21) Appl. No.: 15/005,196

(22) Filed: Jan. 25, 2016

(65) Prior Publication Data

US 2016/0223672 A1    Aug. 4, 2016

(30) Foreign Application Priority Data

Jan. 30, 2015    (DE) .................. 10 2015 101 359

(51) Int. Cl.
| | | |
|---|---|---|
| *G01S 17/10* | (2006.01) | |
| *G01S 7/484* | (2006.01) | |
| *G01S 7/486* | (2006.01) | |
| *G01S 17/00* | (2006.01) | |
| *G01S 7/00* | (2006.01) | |
| *G01S 7/481* | (2006.01) | |

(52) U.S. Cl.
CPC ............ *G01S 17/102* (2013.01); *G01S 7/003* (2013.01); *G01S 7/484* (2013.01); *G01S 7/486* (2013.01); *G01S 7/4815* (2013.01); *G01S 17/003* (2013.01)

(58) Field of Classification Search
CPC .......... G01B 11/14; G01B 17/00; G06F 15/00
See application file for complete search history.

(56) References Cited

U.S. PATENT DOCUMENTS

| | | | | |
|---|---|---|---|---|
| 2011/0288818 | A1* | 11/2011 | Thierman | G01B 11/00 |
| | | | | 702/159 |
| 2014/0152813 | A1 | 6/2014 | Wilks et al. | |
| 2014/0160458 | A1* | 6/2014 | Halmos | G01S 17/003 |
| | | | | 356/4.01 |
| 2014/0350836 | A1* | 11/2014 | Stettner | G01S 17/023 |
| | | | | 701/301 |
| 2015/0116585 | A1 | 4/2015 | Damhofer | |

FOREIGN PATENT DOCUMENTS

DE    10 2013 209 044 A1    11/2014

* cited by examiner

*Primary Examiner* — Luke D Ratcliffe
(74) *Attorney, Agent, or Firm* — Eschweiler & Potashnik, LLC (57) ABSTRACT

An apparatus for determining distance information. The apparatus includes a control module configured to control a transmission of a request signal by a transmit module. The request signal includes information related to a request for information related to a light modulation of a modulated light emitted by a time of flight light source. The control module is configured to provide a modulation reference signal to a time of flight sensor circuit for determination of distance information after the request for information related to the light modulation. The modulation reference signal is based on a receive signal received by a receiver module from the time of flight light source.

17 Claims, 5 Drawing Sheets

APPARATUS FOR DETERMINING DISTANCE INFORMATION, TIME OF FLIGHT LIGHT SOURCE AND A DOCKING STATION

CROSS REFERENCE TO RELATED APPLICATIONS

This application claims priority to German Application No. 102 015 101 359.2, filed on Jan. 30, 2015, and incorporated herein by reference in its entirety.

FIELD

Embodiments relate to Time of Flight systems, and in particular to an apparatus for determining distance information, a mobile device, a time of flight light source and a docking station.

BACKGROUND

Time of flight (TOF) cameras are based on a measurement of a delay between the emission of an modulated light signal, which is then reflected by an object, and the reception of the modulated light signal at a photon mixing device (PMD) imager. The measured delay is proportional to the distance of the object. The modulated light signal corresponds to a modulated light, emitted by a time of flight light source, based on a light modulation.

SUMMARY

Some embodiments relate to an apparatus for determining distance information. The apparatus comprises a control module configured to control a transmission of a request signal by a transmit module. The request signal comprises information related to a request for information related to a light modulation of a modulated light emitted by a time of flight light source. The control module is configured to provide a modulation reference signal to a time of flight sensor circuit for determination of distance information after the request for information related to the light modulation. The modulation reference signal is based on a receive signal received by a receiver module from the time of flight light source.

Some embodiments relate to a time of flight light source. The time of flight light source comprises a time of flight light source circuit configured to emit modulated light. The time of flight light source further comprises a control module configured to control a transmission of a modulation signal comprising information related to a modulation of the modulated light emitted by the time of flight light source circuit to at least two devices comprising a time of flight sensor circuit.

Some embodiments relate to a docking station for a mobile device. The docking station comprises an output interface configured to provide a modulation reference signal for a mobile device connected to the docking station. The modulation reference signal is based on a light modulation of a modulated light emitted by a time of flight light source in proximity of the docking station.

BRIEF DESCRIPTION OF THE DRAWINGS

Some embodiments of apparatuses and/or methods will be described in the following by way of example only, and with reference to the accompanying figures, in which.

DETAILED DESCRIPTION

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figure 1:
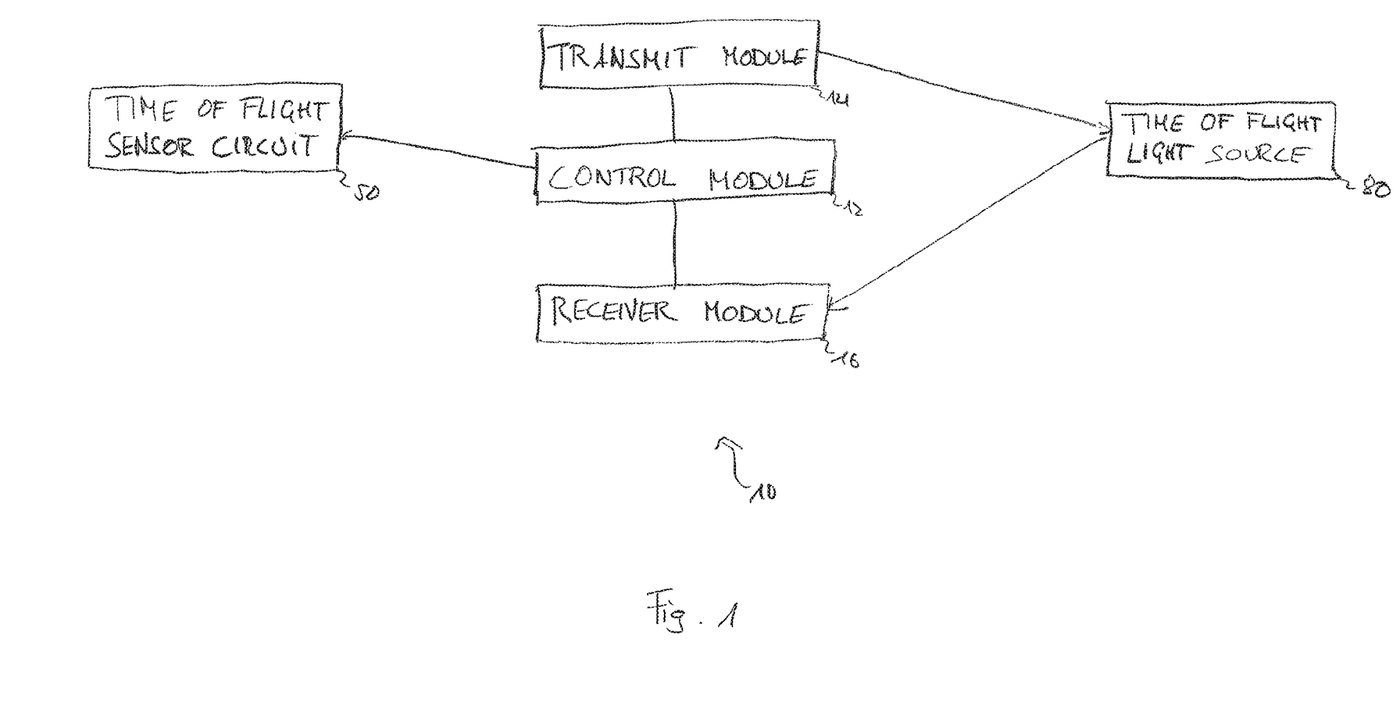
FIG. 1 shows a block diagram of an apparatus for determining distance information.

FIG. 1 shows a block diagram of an embodiment of an apparatus 10 for determining distance information. The apparatus 10 comprises a control module 12 configured to control a transmission of a request signal by a transmit module 14. The request signal comprises information related to a request for information related to a light modulation of a modulated light emitted by the time of flight light source 80. The control module 12 is configured to provide a modulation reference signal to a time of flight sensor circuit 50 for determination of distance information in response to the request for information related to the light modulation. The modulation reference signal is based on a receive signal received by a receiver module 16 from the time of flight light source 80.

Due to the request for information related to a light modulation of a modulated light, an external, shared or public time of flight light source may be useable. In this way energy consumption may be reduced and/or less component space for the apparatus may be required. When using a request signal, a shared light source may be activated or modulation of a shared light source may be started when a demand for modulated light is present.

FIG. 1 further shows a transmit module 14, a receiver module 16, a time of time of flight sensor circuit 50 and a time of flight light source 80. The control module 12 may be coupled to the internal or external transmit module 14 and the internal or external receiver module 16.

The control module may trigger a transmission of the request signal. The transmit module 14 may transmit the request signal wirelessly or wire bound, for example. The transmit module 14 may further use additional signal processing mechanisms, such as encoding, pre-equalization etc. before transmission, for example. The transmit module 14 may transmit the request signal by using a Wireless Fidelity (WiFi) network transmission channel, a Wireless Local Area Network (WLAN) transmission channel, Bluetooth transmission channel, Near Field Communication (NFC) transmission channel, Local Area Network (LAN) transmission channel for example.

The request signal may, for example, correspond to a signal comprising a single pulse or a sequence of pulses, which may indicate a request for a light modulation service, or may be a data transmission signal built on a networking technology, such as WLAN, NFC, LAN or Bluetooth. Optionally, the data transmission signal may, in addition to the request for information related to a light modulation, comprise at least one element of the group of information related to a device identifier, information related to an authentication, information related to a usage type, information related to a usage duration, information related to a service request, information related to an activation of the time of flight light source, information related to a polarization of the modulated light, information related to a wavelength of the modulated light, and information related to a modulation frequency range. The information related to a light modulation may, in addition to information related to a frequency and/or wavelength of the modulated light, comprise information related to a phase of the modulated light, or information related to a polarization of the modulated light. In some embodiments, the request signal may be transmitted in response to the activation by a user of a control panel or a button of a user interface, e.g. an App in a smart phone device.

The time of flight light source 80 may generate the modulated light at a predetermined light modulation. The modulated light may be an amplitude (intensity) modulation of the light waves of the modulated light. This may be generated by or be based on an oscillator signal generated within the time of flight light source 80 having the predetermined light modulation.

The modulated light of the time of flight light source 80 may be based on a light modulation. The light modulation may be based on the output signal of an oscillator. The time of flight light source may comprise an infra-red light or visible light emitting circuit, and the modulated light may comprise infra-red or visible light, for example. The emitting circuit may include one or more infra-red or visible light emitting diodes, for example, which may be activated based on the light modulation.

The receiver module 16 may receive the receive signal wirelessly or wire bound, for example. The receiver module 16 may, for example, further use additional signal processing mechanisms, such as decoding, equalization etc. while receiving. The receiver module 16 may receive the receive signal using a Wireless Fidelity (WiFi) network transmission channel, a Wireless Local Area Network (WLAN) transmission channel, Bluetooth transmission channel, or Near Field Communication (NFC) transmission channel, for example. Alternatively, the receiver module may use a photo detector to detect the modulated light of the time of flight light source 80 to recover the receive signal. The receiver module 16 and/or the transmit module 14 may be implemented by a transceiver module.

The receive signal may be received in response to the request signal. The receive signal may, for example, correspond to a signal based on the light modulation of the time of flight light source 80, or may comprise information related to the light modulation of the time of flight light source 80. The receive signal may comprise the same frequency or the same modulation as the modulated light emitted by the time of flight light source. The receive signal may be based on or be equal to the output signal of the oscillator of the time of flight light source 80 used for modulating the emitted light, for example. The information related to the light modulation may, for example, comprise information related to a frequency and/or wavelength of the light modulation of the time of flight light source 80. In addition the receive signal may optionally comprise information related to a phase of the light modulation of the time of flight light source 80. Optionally, the receive signal may further comprise information related to a usage of the time of flight light source 80, or information related to a usage duration etc. The receive signal may be received using a dedicated channel, e.g. a wireless or wired connection, for example. Alternatively, the receive signal may be derived from the modulated light, for example, by performing a clock recovery or similar procedure on the modulated light as detected by a photodetector.

The modulation reference signal may be based or be equal to the receive signal (e.g. comprising the same frequency and/or the same modulation). For example, the modulation reference signal may be based on or be equal to the output signal of the oscillator of the time of flight light source 80 used for modulating the emitted light. Alternatively, the control module may generate the modulation reference signal based on the information on the related to the light modulation of the time of flight light source contained by the receive signal. For example, the receive signal may comprise information on the frequency of the light modulation and the control module controls an oscillator module so that the oscillator module outputs an oscillator output signal (representing the modulation reference signal) comprising the frequency of the light modulation.

The apparatus 10 may comprise or be an imaging device or a device which may be used to determine distance information related to an object. For example, the apparatus 10 may be a time of flight (TOF) system. It may be desired to determine distance information related to an object. The object may be a hand or a finger of a person, or thing, or scenery to be photographed, for example. For example, the object may be three-dimensional (3D), e.g. the object may have a height, width and depth. In the case where the apparatus 10 is an imaging device, e.g. a time of flight camera, the apparatus 10 may be used to produce a three-dimensional image of the object.

The time of flight sensor circuit 50 may include at least one pixel element, e.g. a photonic mixing device (PMD) or be at least part of an image sensor circuit, for example, and may include a pixel sensor array, e.g. an array of pixel elements, for example. Each pixel element of the pixel array may be configured to receive reflected modulated light, which may be emitted by the time of flight light source 80 and reflected by an object, for example.

The operation of the time of flight sensor circuit 50 may be controlled by the modulation reference signal. For example, the modulation reference signal may be a biasing signal applied to the pixel elements of the sensor circuit for turning on or off of the pixel elements (e.g. or the photogate(s)) of the sensor circuit. For example, the modulation reference signal may alternatingly bias or toggle each of the photogates of the PMD at a biasing frequency, based on or equal to or a multiple of the frequency of the modulation reference signal. The modulation reference signal may therefore control the operation of the time of flight sensor circuit 50 and the generation of a sensor signal generated by a pixel element in response to the incoming reflected modulated light received by the pixel element. The sensor signal may comprise a voltage or current proportional to a number of photogenerated charge carriers generated at a pixel element when the modulation reference signal is applied to one or more photogates of the pixel element, for example.

The time of flight sensor circuit, a processing module or the control module 12 may be configured to produce a distance information related to one or more points (e.g. only one point, a line of points, or an array of points) of an object, based on the sensor signal received by the time of flight sensor circuit 50 by determining a phase delay between the modulation reference signal and the incoming reflected modulated light. By determining the distance information, a three-dimensional image of the object may be produced In some implementations, at least part of the control module 12 may be implemented within the pixel image array, for example within the pixel sensor array.

The apparatus 10 may, for example, further comprise the time of flight sensor circuit 50 configured to provide the distance information based on the modulation reference signal and reflected modulated light emitted by the time of flight light source 80 and reflected by an object. Through integration on the same hardware device or semiconductor die, communication with the time of flight sensor circuit may be simplified and space requirements may be reduced.

The usage of a request signal to obtain the modulation reference signal from an external source, for example a light source implemented as an infrastructure in buildings or a light source implemented in other mobile devices with bigger battery capacity such as a laptop, allows that the time of flight sensor circuit 50 to be implemented in a device and to be functional as a 3D camera even though the device in which the time of flight sensor circuit 50 is implemented is not capable to generate the modulation reference signal and the modulated light. This allows the time of flight sensor circuit to be implemented without light source and modulation reference circuit in e.g. mobile phones where energy saving and cost saving considerations are important.

Additionally, the control module 12 may be configured to control a transmission of an authentication signal comprising information related to an authentication. The information related to an authentication may be used to determine, if the device comprising the apparatus is authorized to use the resource, to identify a user and/or to protocol a usage, which may lead to an improved usage of shared time of flight light sources. In embodiments, the information related to an authentication may for example be based on an authentication token, an access key or an identity record.

Optionally, additionally or alternatively, the control module 12 may be further configured to control the transmission of a request signal based on information related to at least one of a local proximity and an availability of the time of flight light source 80. A search and pairing function may be used to detect time of flight light sources. The control module 12 may, for example, be configured to trigger a continuous search for and detect available light sources in proximity, request the information related to the light modulation, authenticate the device or the device user, and/or enable the determination of distance information, based on the light modulation, which may enable a seamless usage of the modulated light. For example, the control module 12 may optionally perform a handover procedure between different time of flight light sources, so the time of flight sensor circuit may use a different time of flight light source if, for example, the conditions change and the different time of flight light source may offer favorable signal properties.

In some embodiments, the request signal may, for example, comprise information related to a request for information related to a first light modulation from a first time of flight light source and information related to a second light modulation from a second time of flight light source. The control module 12 may be further configured to control an adaptation of the phase of the first light modulation or the second light modulation, based on the request for information related to the first light modulation from the first time of flight light source and the information related to the second light modulation from a second time of flight light source. The modulation reference signal for the time of flight sensor circuit 50 may be based on the first and second light modulations. Adapting the phase of the first or second light modulation may bring the first and second light modulations in a fixed relation, which may enable a concurrent usage of the modulated light of both time of flight light sources.

Using modulated light from two light sources may improve the precision and resolution of the distance information. An image of a region of an object may be produced based on first sensor pixel image data and the second sensor pixel image data. This may lead to distance information of a region of the object with an improved resolution or more detailed information, for example. Furthermore, for example, multipath propagation of light transmitted from the first or second time of flight light source may be eliminated or reduced based on a comparison of the first and second sensor pixel image data from light emitters having different spatial offsets.

The first and second time of flight light sources may, for example, be arranged at different equidistant positions relative to the time of flight sensor circuit, or symmetrically with respect to at least one axis of symmetry of the time of flight sensor circuit. The first time of flight light source may be configured to emit light during a first time interval and the second time of flight light source may be configured to emit light during a second time interval, for example. The first and second time of flight light source may, for example, be configured to simultaneously emit differently polarized light.

In some embodiments, the control module 12 may be configured to provide the modulation reference signal based on one of at least two receive signals received by the receiver module 16 from at least two different available time of flight light sources. Using one of at least two available receive signals may enable the control module 12 to use the use a light modulation with favorable properties.

For example, the control module 12 may be further configured to select the one receive signal of the at least two receive signals based on a degree of usability. The degree of usability for the at least two available time of flight light sources may, for example, be based on at least one of the modulated light emitted by one of the at least two available time of flight light sources and one of the at least two receive signals for the at least two available time of flight light sources. The degree of usability may provide a criterion to determine the receive signal to use, based on a measurement of properties of the emitted light of the at least two available light sources. The control module may, for example, be configured to determine the degree of usability by measuring the intensity, coverage, multi-path propagation etc. of the modulated light and the reflected modulated light.

Optionally, the receiver module 16 may, for example, be configured to receive modulated light from the time of flight light source 80 and to provide a detection signal having a frequency which depends on a modulation frequency of the modulated light. The control module 12 may be configured to generate the modulated reference signal based on the detection signal (e.g. representing the receive signal). Generating the modulated reference signal from the modulated light may eliminate the need for a dedicated wired or wireless transmission of the information related to the light modulation, for example.

For example, the receiver module 16 may comprise a photodetector configured to detect a modulated light. The photodetector may also provide a detection signal comprising a voltage or current proportional to an intensity of the modulated light received by the receiver module 16. In this way, the receiver module 16 may be configured to provide and/or generate the detection signal, based on the received modulated light. The detection signal may have a frequency, which may be based on or depend on the frequency of the light modulation of the modulated light. For example, the frequency of the detection signal may be substantially equal to or a multiple of the frequency of the light modulation of the modulated light.

The control module 12, the transmit module 14, the receiver module and the/or the time of flight sensor circuit 50 may be independent hardware units or part of a base band processor, a digital signal processor, a transmitter, a transceiver or a microcontroller or a computer program or a software product for running on a base band processor, a digital signal processor or a microcontroller, for example.

More details and aspects of the apparatus 10 are mentioned in connection with the proposed concept or one or more examples described above or below. The apparatus 10 may comprise one or more additional optional features corresponding to one or more aspects of the proposed concept or one or more examples described above or below.

Figure 2:
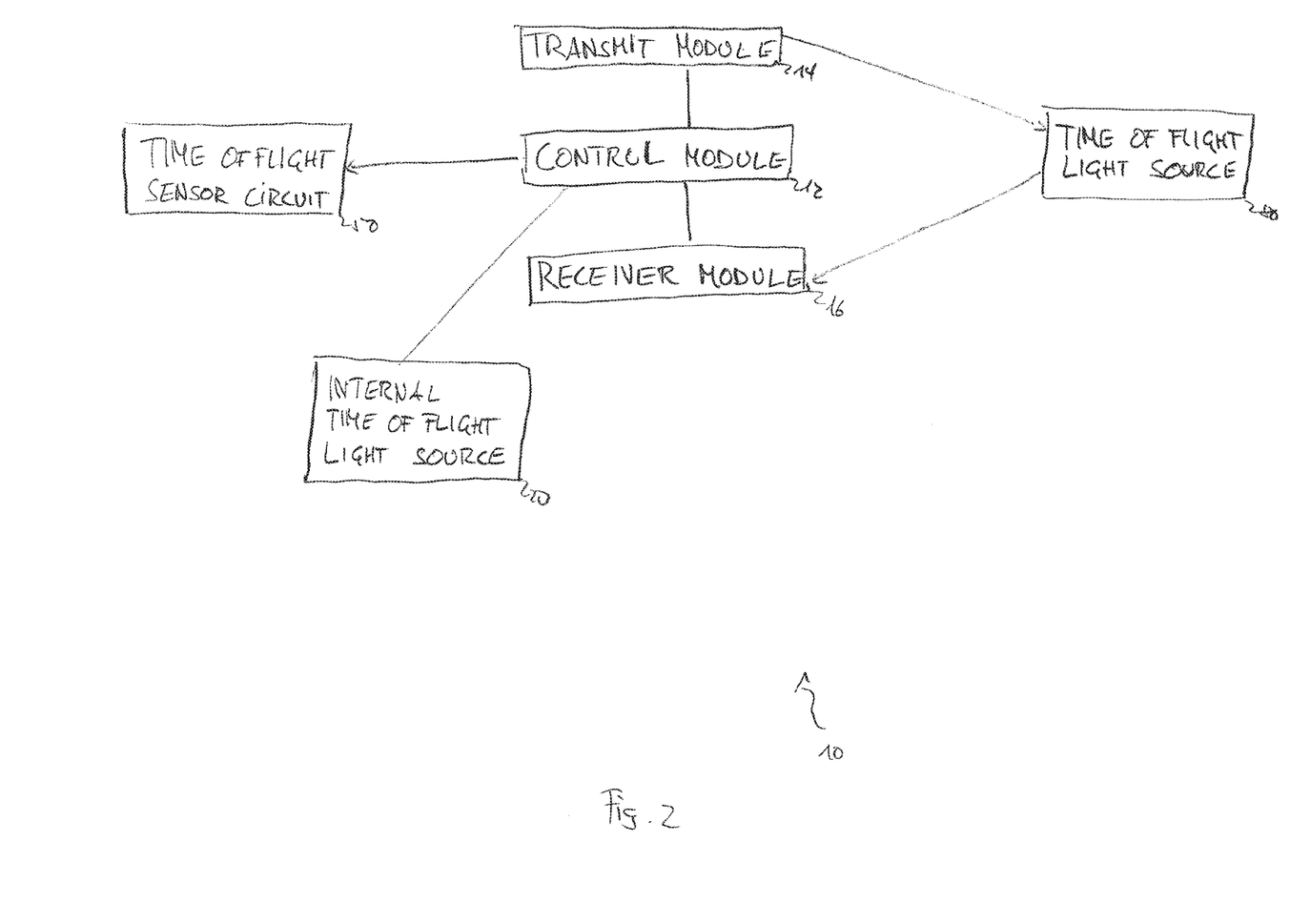
FIG. 2 shows a block diagram of an apparatus for determining distance information with an internal light source.

FIG. 2 shows a block diagram of an embodiment of the apparatus 10 comprising the control module 12 and an optional internal time of flight light source 20. FIG. 2 further shows the transmit module 14, the receiver module 16, a time of time of flight sensor circuit 50 and a time of flight light source 80. The control module 12 is coupled to the transmit module 14, the receiver module 16, the internal time of flight light source 20 and the time of flight sensor circuit 50.

The apparatus may further comprise the internal time of flight light source 20 emitting modulated light based on an internal modulation signal (e.g. generated by an internal oscillator module). The control module 12 may be further configured to control an adaptation of the phase of the receive signal of the time of flight light source 80 or the internal modulation signal. The modulation reference signal for the time of flight sensor circuit 50 may be based on the receive signal of the time of flight light source 80 and the internal modulation signal. Adapting the phase of the receive signal or the internal modulation signal may bring the modulation based on the received signal and internal modulation signal in a fixed relation, which may enable a concurrent usage of the modulated light of both time of flight light sources.

Using modulated light from two light sources may improve the precision and resolution of the distance information. An image of a region of an object may be produced based on first sensor pixel image data and the second sensor pixel image data. This may lead to distance information of a region of the object with an improved resolution or more detailed information, for example. Furthermore, for example, multipath propagation of light transmitted from the first or second time of flight light source may be eliminated or reduced based on a comparison of the first and second sensor pixel image data from light emitters having different spatial offsets.

The internal time of flight light source 20 and the time of flight light source 80 may, for example, be arranged symmetrically with respect to at least one axis of symmetry of the time of flight sensor circuit. The internal time of flight light source 20 may be configured to emit light during a first time interval and the time of flight light source 80 may be configured to emit light during a second time interval, for example. The internal time of flight light source 20 and the time of flight light source 80 may, for example, be configured to simultaneously emit differently polarized light.

More details and aspects of the apparatus are mentioned in connection with the proposed concept or one or more examples described above (e.g. FIG. 1). The apparatus 10 may comprise one or more additional optional features corresponding to one or more aspects of the proposed concept or one or more examples described above or below.

Figure 3:
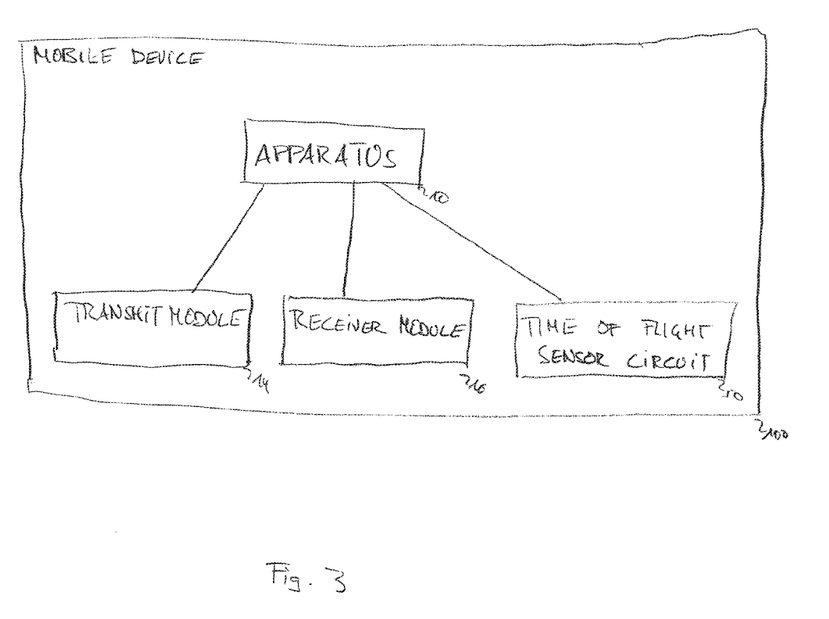
FIG. 3 shows a block diagram of a mobile device comprising an apparatus for determining distance information.

FIG. 3 shows a block diagram of an embodiment of a mobile device 100 comprising an apparatus 10 for determining distance information. The apparatus 10 may be implemented in the mobile device 100. The mobile device 100 may for example correspond to a smartphone, a cell phone, user equipment, a mobile, a mobile station, a laptop, a notebook, a personal computer, a Personal Digital Assistant (PDA), a gaming device or a car.

Using the apparatus 10 in the mobile device 100 may for example allow the mobile device 100 to use an external time of flight light source, which may remove the need for an internal light source, which may lead to a lower power consumption.

The apparatus 10 may be implemented corresponding to the apparatus described in connection with FIG. 1 or another example mentioned above or below.

For example, the mobile device may be implemented without a time of flight light source. This may lead to a decreased current consumption and/or may require less space and/or reduce the costs for the mobile device.

The control module 12 may, for example, be further configured to trigger a process within a mobile device 100 based on a movement of an object detected based on the determined distance information. The movement of an object may correspond to a finger, a hand, an arm, ahead or a body gestures or a pointer moved by a user, which may be predefined, and which may be associated with specific triggers of processes. Gestures may, for example, be used to start application software, control playback of media, type on a virtual keyboard or move a pointing indicator on a user interface.

More details and aspects of the mobile device 100 and the apparatus 10 are mentioned in connection with the proposed concept or one or more examples described above or below (e.g. FIG. 1 or 2). The mobile device 100 and the apparatus 10 may comprise one or more additional optional features corresponding to one or more aspects of the proposed concept or one or more examples described above or below.

Figure 4:
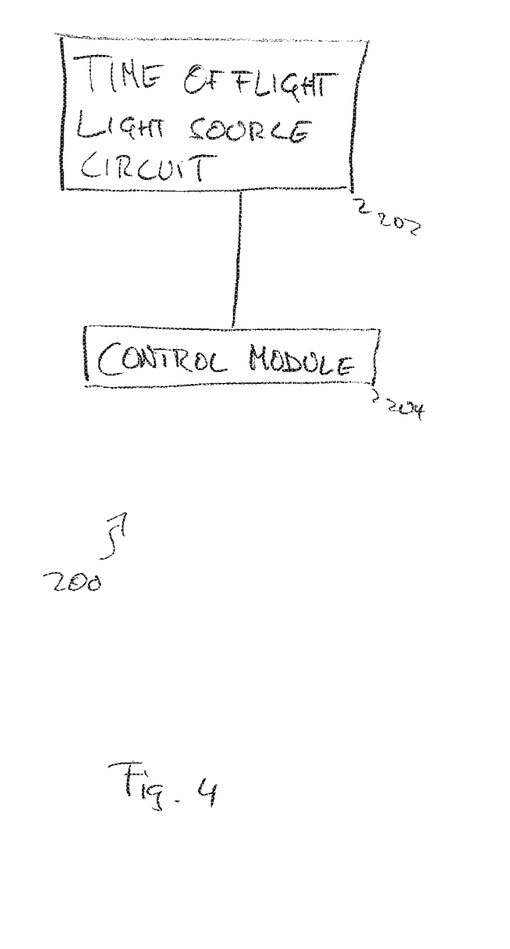
FIG. 4 shows a block diagram of a time of flight light source.

FIG. 4 shows a block diagram of an embodiment of a time of flight light source, comprising a time of flight light source circuit 202, and a control module 204. The control module 204 is coupled to the time of flight source circuit.

The time of flight light source circuit 202 is configured to emit modulated light. The control module 204 is configured to control a transmission of a modulation signal comprising information related to a modulation of the modulated light emitted by the time of flight light source circuit 202 to at least two devices comprising a time of flight sensor circuit.

Providing information related to a modulation of the modulated light to at least two devices comprising a time of flight sensor circuit may enable the use of a time of flight light source as a shared resource. The shared resource may correspond to a time of flight light source used locally, e.g. within an office or a home, and shared among a plurality of users. It may also correspond to a public time of flight light source, which may be used, for example, for free in a dedicated location such as, for example, a café, or, on a flat fee or pay-per-use model, provided by a service provider for time of flight light sources. The time of flight light source in FIG. 1 may be implemented similar to the time of flight light source 200.

The time of flight light source circuit 202 may comprise an infra-red light emitting circuit or a visible light emitting circuit, and the modulated light may be infra-red light or visible light, for example. The emitting circuit may comprise one or more infra-red light emitting diodes or one or more visible light emitting diodes, for example. The light emitting diode may emit the modulated light with the light modulation, controlled by an oscillator output signal of an oscillator. For example, the modulated light comprises the same frequency or the same modulation as the oscillator output signal.

The modulation signal may correspond to a signal based on the light modulation (e.g. have the same frequency or modulation) of the time of flight light source 200 and may correspond to the oscillator output signal, or may comprise information related to the light modulation of the time of flight light source 200. For example, the modulation signal may be based on the output signal of the oscillator. The information related to the light modulation may comprise information related to a frequency and/or wavelength of the light modulation. The modulation signal may further comprise information related to a usage of the time of flight light source 200, information related to a phase of the modulated light, information related to a usage duration, or information related to a polarization of the modulated light etc.

The time of flight light source circuit 202 may, for example, be located at a fixed position of an infrastructure or a non-handheld structure. The infrastructure may, for example, further comprise a docking station for a mobile device comprising a time of flight sensor circuit, which may put the time of flight sensor circuit in a fixed distance to the time of flight light source. For example, the infrastructure may correspond to a public transport vehicle or station, a café, an airplane etc. Having a time of flight light source 200 as part of an infrastructure may decrease the power consumption of devices using the time of flight light source, compared to using an internal time of flight light source. It may further provide a device with a fixed distance to the time of flight light source, if the device is attached to a docking station, so the modulation signal may, for example, comprise a light modulation adjusted by a phase difference caused by the fixed distance, so a determination of an absolute distance of an object to the device may be enabled.

Optionally, the control module 204 may be configured to control the transmission of the modulation signal further based on information related to an authentication for at least one of the at least two devices comprising time of flight sensor circuits. The information related to an authentication may be used to determine, if the device is authorized to use the resource, to identify a user, and/or to protocol a usage, which may lead to an improved usage of the time of flight light source, for example. The information related to an authentication may for based on an authentication token, an access key, or an identity record, for example.

The time of flight light source 200 of claim 13 may, for example, further comprise a timer module 206 configured to provide an usage time control signal comprising information related to an extent of usage of the time of flight light source 200. The control module 204 may be configured to control at least one of the transmission of the modulation signal, the activation of the time of flight light source and the deactivation of the time of flight light source based on the information related to the extent of usage of the time of flight light source 200. The time module 206 may, for example, enable the usage of the time of flight light source for a fixed period of time, based on a credit or token system, or may be used to protocol and account the usage for a device. The time control signal may, for example, comprise information related to an activation of the time of flight light source, information related to a deactivation of the time of flight light source, information related to a usage duration, information related to a remaining duration for a predefined interval, information related to a remaining time account balance, information related to usage timestamps etc.

The control module 204 may, for example, be configured to control the transmission of the modulation signal to the at least two devices comprising a time of flight sensor circuit also based on information related to a at least one of a local proximity and availability of at least one of the at least two devices comprising a time of flight sensor circuit. A search and pairing function may be used to detect devices comprising a time of flight sensor circuit. The control module 204 may, for example, be configured to continuously search for and detect available devices comprising a time of flight sensor circuit in proximity, provide the information related to the light modulation, and authenticate the device or the device user. Such a function may enable a seamless and configuration-free usage of the time of flight light source.

The control module 204 may, for example, be further configured to control a concurrent transmission of the modulation signal to the at least two devices comprising a time of flight sensor circuit. The concurrent transmission may, for example, start and end at the same time, or may have start and end points differing between devices. Such concurrent usage may increase the availability of light sources, as an arbitrary number of devices may concurrently use the resource.

The control module 204 and the optional timer module 206 may be independent hardware units or part of a base band processor, a digital signal processor, a transmitter, a transceiver or a microcontroller or a computer program or a software product for running on a base band processor, a digital signal processor or a microcontroller, for example. The control module 204 and the optional timer module 206 may be implemented independently from each other or may be realized at least partly together.

More details and aspects of the time of flight light source 200 are mentioned in connection with the proposed concept or one or more examples described above (e.g. FIGS. 1 to 3). The time of flight light source 200 may comprise one or more additional optional features corresponding to one or more aspects of the proposed concept or one or more examples described above or below.

Figure 5:
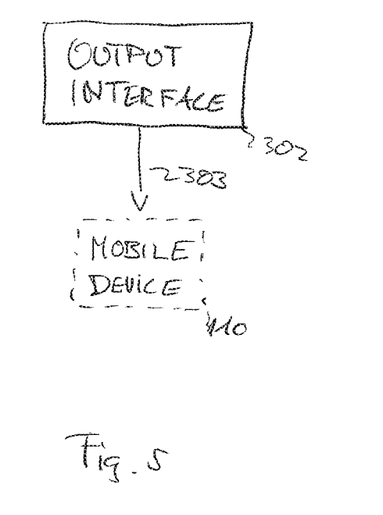
FIG. 5 shows a block diagram of a docking station.

FIG. 5 shows a block diagram of an embodiment of a docking station 300 for a mobile device 110, comprising an output interface 302.

The output interface 302 is configured to provide a modulation reference signal 303 for a mobile device 110 connected to the docking station. The modulation reference signal is based on a light modulation of a modulated light emitted by a time of flight light source in proximity of the docking station.

The docking station 300 may, for example, enable mobile devices to use the time of flight light source in proximity of the docking station, which may decrease the power consumption of the mobile device comprising a time of flight sensor circuit, or may enable devices comprising a time of flight sensor circuit without an internal time of flight light source to determine distance information, based on the modulation reference signal and the light source in proximity.

The output interface 302 may, for example, correspond to a wired or wireless interface between the docking station 300 and the mobile device 100. The output interface 302 may, for example, be implemented using standard interfaces, such as Universal Serial Bus (USB), Thunderbolt etc., or standard protocols, such as LAN, WLAN Bluetooth etc., or using an application specific wired or wireless protocol. The output interface 302 may, for example, also provide the mobile device with a power supply.

Optionally, the docking station 300 may further be in a fixed position relative to the time of flight light source and have a fixed distance to the time of flight light source, for example as part of an infrastructure. The modulation reference signal 303 may be transmitted wirelessly or wirebound from the time of flight light source, or may emanate from a separate module providing both the docking station and the time of flight light source with the modulation reference signal or information related to the modulation reference signal, for example. The mobile device 110 may be implemented similar to the mobile device in FIG. 3.

The output interface 302 may, for example, be further configured to detect a mobile device 110 comprising a time of flight sensor circuit connected to the output interface 302. A control module 304 may be configured to control a transmission of a request signal by a transmit module 306 based on detection of the device 110. The request signal may comprise information related to a request for information related to a light modulation of a modulated light emitted by a time of flight light source. The request signal, the information related to the light modulation, the control module 304 and the transmit module 306 may correspond to the request signal, control module 12 and transmit module 14 as mentioned above (e.g. FIG. 1). The modulation reference signal may be based on a receive signal, which may correspond to the received signal as described above, received after the request for information related to the light modulation.

More details and aspects of the docking station 300 are mentioned in connection with the proposed concept or one or more examples described above (e.g. FIGS. 1 to 4). The docking station 300 may comprise one or more additional optional features corresponding to one or more aspects of the proposed concept or one or more examples described above or below.

Some embodiments relate to shared TOF light sources. TOF sensors may allow 3D imaging applications such as gesture control. For example, an active light source which is modulated by a modulation signal is used.

The power consumption of cameras as well as the cost would be increased when installing a full TOF camera (imager+light source) in small and cheap handheld devices such as handheld mobile phones, for example.

According to an aspect, handheld devices may comprise a time of flight sensor circuit without an internal time of flight light source and use or share one or more time of flight light sources that are installed in the environment and connected to a power supply or a big power reservoir (e.g. a high capacity battery). The costs for implementing a time of flight sensor circuit without an internal time of flight light source may be considerably lower and the energy consumption for the handheld device may be lower when using the time of flight system.

To transmit the modulation signal from the time of flight light source, a wired or wireless connection may be used, for example. A search and paring function may be installed which may allow the handheld device as well as the light source to communicate and detect each other. Furthermore, identification or authentication codes may be used in order to use a public time of flight light source. Hot spots of time of flight light sources may be created in cafes and other public places. In trains and airplanes, seats or aisles may be equipped with a public time of flight light source, which may be activated with an identification code that is provided to the user's mobile device after a payment procedure. Furthermore, seat may have a docking station which may allow mounting of the mobile phone and electrical connection to the public time of flight light source.

In some embodiments, a user may have a full time of flight camera, comprising a time of flight sensor circuit and a time of flight light source, for example in a TV set or a laptop. The user may also have a docking station for the smart phone, which may be used for charging the smart phone and having a fixed installation. The mounting station may be connected to the time of flight light source via a cable or wirelessly, to transfer the modulation signal to the smart phone. Once installed, the user may start an application which starts a transmission of a usage request to the time of flight light source. If the time of flight light source is turned off, the time of flight light source may turn on upon the receipt of the request. The time of flight light source may start to transfer the modulation signal to the mounting station and, from there, to the smart phone. The time of flight light source may concurrently start to transmit the modulated light. The user may also use the time of flight light source without a docking station. A connection may be established with the installed time of flight light source, for example by a cable or wireless connection between the handheld device and the time of flight light source. If the mobile device comprises a light source, the time of flight sensor may still use the installed external time of flight light source either in addition such that the time of flight sensor's effective resolution can be increased by using both time of flight light sources or solely in order to save energy for the mobile device.

In some embodiments, a user may have a seat in a vehicle, which is equipped with a public time of flight light source. The user may be aware of an identification code which may allow him to use the public time of flight light source. Similar to the above, a docking station for the mobile device may be installed for ease. The user may start the application and enter the identification code to start operation of the time of flight light source.

In some embodiments, in a public place, a plurality of time of flight light sources may be installed at different locations. A user may start an application on his mobile device to detect whether time of flight light sources are available. The application may start a test program and communicate with the first of the available time of flight light sources to start the light emission and a wireless transfer of the modulation reference signal. The application may then determine a degree of usability for this time of flight light source. After that, the next available TOF light source may be tested. At the end, the application may decide which time of flight light source to use. If at least two time of flight light sources are acceptable for the application, the app may decide to send a request to adjust the phase or delay of at least one of the two light sources such that the time of flight sensor's resolution may be increased by using both light sources as described above. As further described above, a specific identification code may be required to input by user in order to start the public TOF light source.

In embodiments, a rental station for time of flight light sources may exist (for example at a beach). Upon payment and security deposit, the light source powered with a high capacity battery may be programmed with a time amount of usage and handed out to a user. The user may start to use the time of flight light source as described above. If the time limit based on the amount of payment runs out, the time of flight light source may deactivate, and the user may pay again to extend the usage time. Such a time restriction may also be used in the above embodiments of a public time of flight light source. Certain security features as used in security-critical applications such as chip cards may be installed in the TOF light source to impede using the time of flight light source without payment.

Some embodiments relate to a method for determining distance information. The method comprises controlling a transmission of a request signal. The request signal comprises information related to a request for information related to a light modulation of a modulated light emitted by a time of flight light source. Further, the method comprises providing a modulation reference signal to a time of flight sensor circuit for determination of distance information after the request for information related to the light modulation. The modulation reference signal is based on a receive signal received from the time of flight light source.

More details and aspects of the method for determining distance information are mentioned in connection with the proposed concept or one or more examples described above (e.g. FIGS. 1 to 3). The method for determining distance information may comprise one or more additional optional features corresponding to one or more aspects of the proposed concept or one or more examples described above or below.

Some embodiments relate to a method for providing a modulation signal. The method comprises emitting modulated light by a time of flight light source circuit. Further, the method comprises controlling a transmission of a modulation signal comprising information related to a modulation of the modulated light emitted by the time of flight light source circuit to at least two devices comprising a time of flight sensor circuit.

More details and aspects of the method for providing a modulation signal are mentioned in connection with the proposed concept or one or more examples described above (e.g. FIG. 4). The method for providing a modulation signal may comprise one or more additional optional features corresponding to one or more aspects of the proposed concept or one or more examples described above or below.

Some embodiments relate to a method for providing a modulation reference signal. The method comprises providing a modulation reference signal by an output interface of a docking station connected to a mobile device. The modulation reference signal is based on a light modulation of a modulated light emitted by a time of flight light source in proximity of the docking station.

More details and aspects of the method for providing a modulation reference signal are mentioned in connection with the proposed concept or one or more examples described above (e.g. FIG. 5). The method for providing a modulation reference signal may comprise one or more additional optional features corresponding to one or more aspects of the proposed concept or one or more examples described above or below.

Example embodiments may further provide a computer program having a program code for performing one of the above methods, when the computer program is executed on a computer or processor. A person of skill in the art would readily recognize that acts of various above-described methods may be performed by programmed computers. Herein, some example embodiments are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further example embodiments are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims might not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

I claim:

1. An apparatus for determining distance information, the apparatus comprising:
    a control circuit configured to control a transmission of a request signal by a transmit module, wherein the request signal comprises information related to a request for information related to a light modulation of a modulated light emitted by a time of flight light source that is external to the apparatus, and
    wherein the control circuit is configured to provide a modulation reference signal to a time of flight sensor circuit located within the apparatus in response to the request for information related to the light modulation, wherein the modulation reference signal is based on a receive signal received by a receive circuit from the time of flight light source in response to the request signal.

2. The apparatus of claim 1, wherein the time of flight sensor circuit is configured to provide the distance information based on the modulation reference signal and reflected modulated light emitted by the time of flight light source and reflected by an object.

3. The apparatus of claim 1,
    wherein the control circuit is further configured to trigger a process within a mobile device based on a movement of an object detected based on the determined distance information.

4. The apparatus of claim 1 implemented in a mobile device.

5. The apparatus of claim 1, wherein the control circuit is configured to control a transmission of an authentication signal comprising information related to an authentication, wherein the authentication signal has data content that the time of flight light source uses to determine whether the control circuit is authorized to use the time of flight light source.

6. The apparatus of claim 1,
    wherein the control circuit is further configured to control the transmission of a request signal based on information related to at least one of a local proximity and an availability of the time of flight light source.

7. The apparatus of claim 1,
    wherein the request signal comprises information related to a request for information related to a first light modulation from a first time of flight light source and information related to a second light modulation from a second time of flight light source,
    wherein the control circuit is further configured to control an adaptation of the phase of the first light modulation or the second light modulation, based on the request for information related to the first light modulation from the first time of flight light source and the information related to the second light modulation from a second time of flight light source,
    wherein the modulation reference signal for the time of flight sensor circuit is based on the first and second light modulations.

8. The apparatus of claim 1,
    wherein the control circuit is configured to provide the modulation reference signal based on one of at least two receive signals received by the receiver module from at least two different available time of flight light sources.

9. The apparatus of claim 8,
wherein the control circuit is further configured to select the one receive signal of the at least two receive signals based on a degree of usability,
wherein the degree of usability for the at least two available time of flight light sources is based on at least one of the modulated light emitted by one of the at least two available time of flight light sources and one of the at least two receive signals for the at least two available time of flight light sources.

10. The apparatus of claim 1, further comprising an internal time of flight light source emitting modulated light based on an internal modulation signal,
wherein the control circuit is further configured to control an adaptation of the phase of the receive signal of the time of flight light source or the internal modulation signal,
wherein the modulation reference signal for the time of flight sensor circuit is based on the receive signal of the time of flight light source and the internal modulation signal.

11. The apparatus of claim 1,
wherein the receive circuit is configured to receive modulated light from the time of flight light source and to provide a detection signal having a frequency dependent on a modulation frequency of the modulated light,
wherein the control circuit is configured to generate the modulated reference signal based on the detection signal.

12. Time of flight light source, comprising
a time of flight light source circuit configured to emit modulated light; and
a control circuit configured to control a transmission of a modulation signal comprising information related to a modulation of the modulated light emitted by the time of flight light source circuit to at least two devices comprising a time of flight sensor circuit.

13. The time of flight light source according to claim 12,
wherein the time of flight light source circuit is located at a fixed position of an infrastructure or a non-handheld structure.

14. The time of flight light source according to claim 12,
wherein the control circuit is configured to control the transmission of the modulation signal further based on information related to an authentication for at least one of the at least two devices comprising time of flight sensor circuits.

15. The time of flight light source according to claim 12 further comprising a timer circuit configured to provide an usage time control signal comprising information related to an extent of usage of the time of flight light source, wherein the control circuit is configured to control at least one of the transmission of the modulation signal, the activation of the time of flight light source and the deactivation of the time of flight light source based on the information related to the extent of usage of the time of flight light source.

16. The time of flight light source according to claim 12,
wherein the control circuit is configured to control the transmission of the modulation signal to the at least two devices comprising a time of flight sensor circuit also based on information related to a at least one of a local proximity and availability of at least one of the at least two devices comprising a time of flight sensor circuit.

17. The time of flight light source according to claim 12,
wherein the control circuit is further configured to control a concurrent transmission of the modulation signal to the at least two devices comprising a time of flight sensor circuit.

* * * * *